United States Patent [19]

Williams

[11] 4,117,256

[45] Sep. 26, 1978

[54] DEAD END APPLIANCE FOR LINEAR BODIES AND DROP WIRE TYPE CONDUCTOR INSTALLATION INCLUDING THE SAME

[75] Inventor: Harrison L. Williams, Euclid, Ohio

[73] Assignee: Preformed Line Products Company, Mayfield Village, Ohio

[21] Appl. No.: 761,524

[22] Filed: Jan. 24, 1977

[51] Int. Cl.² .................. H02G 7/00; H01B 17/56
[52] U.S. Cl. ........................ 174/40 R; 24/73 HH; 24/131 R; 174/170
[58] Field of Search ............ 174/40 R, 43, 79, 170, 174/174, 175, 208; 24/73 CE, 73 CP, 73 HH, 73 HL, 73 HR, 73 SA, 73 TH, 81 C, 129 R, 129 C, 131 R, 131 C, 230.5 R, 230.5 AD, 230.5 W, 230.5 PH, 230.5 T; 248/61, 211, 213, 215, 303, 304, 339, 340, 341

[56] References Cited

U.S. PATENT DOCUMENTS

| D. 235,125 | 5/1975 | Schlachter | 24/73 HH X |
| 1,146,981 | 7/1915 | Weinberg | 24/73 HH X |
| 1,338,686 | 5/1920 | Fennessy | 24/73 CE X |
| 1,889,113 | 11/1932 | Shope | 24/131 R |
| 2,124,049 | 7/1938 | Battista et al. | 24/73 HH X |
| 2,607,977 | 8/1952 | Serrell | 24/73 CE X |
| 3,021,381 | 2/1962 | Wengen | 248/61 X |
| 3,080,631 | 3/1963 | Ruhlman | 24/131 C |
| 3,193,229 | 7/1965 | Stock | 248/304 X |

FOREIGN PATENT DOCUMENTS

| 1,554,922 | 12/1968 | France | 174/79 |
| 1,072,797 | 3/1954 | France | 24/131 R |
| 1,132,715 | 11/1956 | France | 248/303 |

Primary Examiner—Laramie E. Askin
Attorney, Agent, or Firm—Fay & Sharpe

[57] ABSTRACT

A dead end appliance for receiving and supporting a drop wire at a selected area therealong. The appliance comprises an elongated body having reversing loops or hooks at the opposite ends thereof. One of the loops defines an appliance mounting loop and has a generally S-shaped configuration adapted to be received over a hook-like mounting member. The other of the loops defines a line retaining loop and has a generally U-shaped configuration. When the appliance is mounted to a service pole or the like by means of the S-shaped mounting loop cooperating with the hook-like mounting member, and with the drop properly installed, the drop wire span extends from the source end of the wire to the generally U-shaped line retaining loop, spirally around the body toward the S-shaped appliance mounting loop, at least once around both the S-shaped loop and the body, around the body to the end thereof immediately adjacent the S-shaped loop and thence generally downward to the terminal end forming the drop end of the wire.

9 Claims, 3 Drawing Figures

DEAD END APPLIANCE FOR LINEAR BODIES AND DROP WIRE TYPE CONDUCTOR INSTALLATION INCLUDING THE SAME

BACKGROUND OF THE INVENTION

This invention pertains to the art of appliances for linear bodies and more particularly to a dead end appliance for such bodies.

The invention is particularly applicable to a drop wire dead end appliance of the type typically used with the electrical distribution lines or cables, telephone lines and the like and will be described with particular reference thereto. However, it will be appreciated by those skilled in the art that the invention has broader applications and could be advantageously employed in other environments.

In the context of the subject application, a drop wire may be generally described as a service line such as an electrical or telephone wire extending from a distribution line to a point of service connection. Typically, the distribution lines extend between line poles disposed adjacent streets, roads and the like and the service or drop wires are connected to the distribution lines for supplying electrical power, telephone service and the like to individual customers. Usually, the individual customer terminal area or connection is disposed near ground level with the distribution line connection being substantially elevated therefrom. Thus, and in order to retain the drop wire elevated over the span thereof so as to not be damaged by vehicles and the like passing thereunder, the span is also elevated adjacent the customer terminal area thereof by means of affixing it to a service pole or the building which is to be serviced. That portion of the drop wire extending from this mounting to the customer terminal area is commonly referred to as the drop end.

It has been desirable to provide what are termed ead end appliances for purposes of mounting and supporting the drop wire span above the terminal area of the line as generally described above. Some prior dead end appliance and clamp designs have met with commercial success, although the overall design and construction therefore have been somewhat more complicated than deemed necessary and/or desirable. Moreover, such prior dead end appliances and clamps have included a number of cooperative component parts which add to overall manufacturing costs. Further, the number of component parts involved lead to and cause some practical installation problems. Accordingly, it has been desired to develop a more simplistic drop wire dead end appliance in order to reduce manufacturing costs and installation problems.

The present invention contemplates a new and improved article which meets the above noted criteria and others and provides a new drop wire dead end appliance which is simple in design, economical to manufacture, simple to install and which is readily adaptable to use in any number of drop wire type installations and environments.

BRIEF DESCRIPTION OF THE INVENTION

In accordance with the present invention, there is provided a drop wire dead end appliance for receiving and supporting a drop wire along a portion of the length thereof. The appliance comprises an elongated body having reversing loops or hooks at the opposite ends thereof. One of these loops defines an appliance mounting loop and the other defines a wire retaining loop. Once the appliance is located on a rigid support member, the drop wire itself may then be installed thereon such that it is wrapped along the elongated body and also wrapped around the appliance mounting loop at least once. The line retaining loop prevents unwrapping of the drop wire span from the appliance.

In accordance with another aspect of the present invention, the appliance mounting loop has a generall S-shaped configuration and the wire retaining loop has a generally U-shaped configuration.

In accordance with still another aspect of the present invention, a plane defined by the appliance mounting loop and body is disposed generally normal to a plane defined by the line retaining loop and the body.

In accordance with a still further aspect of the present invention, at least the body and S-shaped mounting loop have roughened surfaces.

The principal object of the present invention is the provision of a new and improved dead end appliance for linear bodies.

Another object of the present invention is the provision of a new and improved dead end appliance which is simple in design and simple to manufacture.

Still another object of the present invention is the provision of a new and improved dead end appliance which is quick and easy to install.

A still further object of the present invention is the provision of a new and improved dead end appliance which may be adapted to use in a number of different environments.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein.

DESCRIPTION OF THE PREFERRED EMBODIMENT

Figure 1:
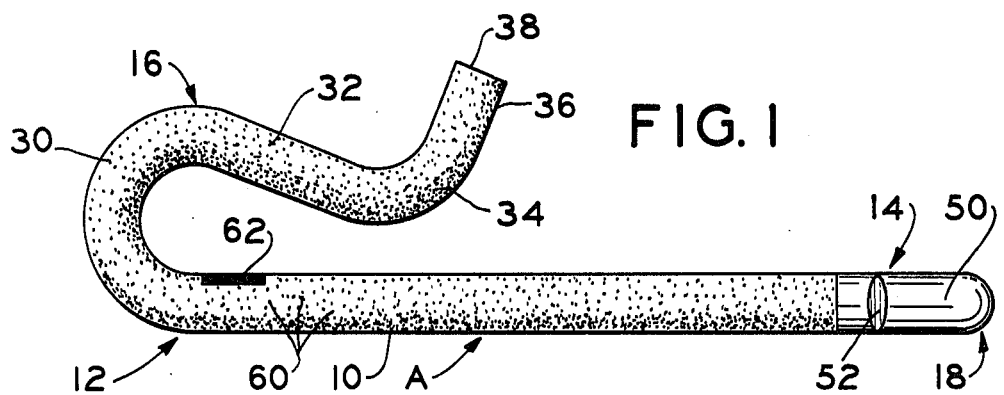
FIG. 1 is a side elevational view of the subject dead end appliance.

Referring now to the drawings wherein the showings are for purposes of illustrating the preferred embodiment of the invention only and not for purposes of limiting same, the FIGURES show a dead end appliance or accessory A operably mounted to a service pole B by means of a hanger or hook-like structure C for supporting a drop wire type conductor D. As described hereinafter, appliance or accessory A is described as being a drop wire type dead end appliance; however, it should be appreciated that the appliance could be advantageously employed for other installation without departing from the intent or scope of the present invention.

Figure 2:
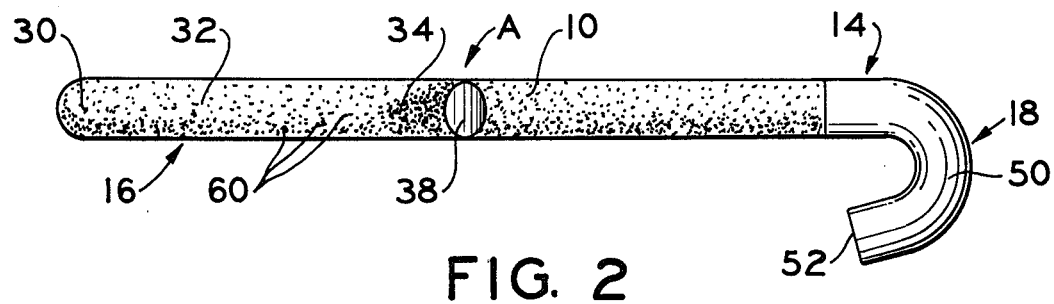
FIG. 2 is a plan view of the dead end appliance shown in FIG. 1.

More particularly, and with reference to FIGS. 1 and 2, drop wire dead end appliance or accessory A is comprised of an elongated, generally straight main body portion 10 having a first end area 12 and a second area 14. A first end portion 16 adjacent first end 12 defines an appliance mounting loop or hook and a second end portion 18 adjacent second end 14 defines a linear body retaining loop or hook. The specific configuration and function of end portions 16, 18 will be described in greater detail hereinafter.

Appliance mounting loop 16 comprises a generally S-shaped reversing loop or hook which reverses back over a section of main body portion 10. This loop includes a first curvilinear section 30 which merges into a first generally straight section 32. This straight section then merges into a second curvilinear section 34 which itself merges into a second generally straight section 36 having an outermost or terminal end 38. As will be particularly noted from FIG. 1, first generally straight section 32 tapers inwardly toward main body portion 10 from its interconnection with first curvilinear section 30 towards its interconnection with second curvilinear section 34.

With particular reference to FIG. 2, it will be seen that linear body retaining loop 18 comprises a generally U-shaped loop or hook which reverses back over a section of main body portion 10. This configuration includes a generally semi-circular curvilinear section 50 terminating in an outermost or terminal end 52.

As will be noted from comparing FIGS. 1 and 2, the general radius of curvature for first curvilinear section 30 of the generally S-shaped appliance mounting loop is greater than the general radius of curvature for curvilinear section 50 of the generally U-shaped linear body retaining loop. Moreover, the generally S-shaped and U-shaped loops are rotated 90° from each other relative to main body portion 10. That is, a plane defined by the S-shaped loop and the main body portion is disposed generally normal to a plane defined by the U-shaped loop and the main body portion. The reasons for this preferred arrangement will be discussed in greater detail hereinafter although it should be appreciated by those skilled in the art that the loops and hooks could be located so that the planes thus formed could be co-planar or inclined at other angles relative to each other without in any way departing from the overall intent or scope of the subject invention.

Drop wire dead end appliance or accessory A may be conveniently formed of any suitable material and preferably has a circular cross-section. One such suitable material is rigid polyvinyl chloride, although other materials could also be advantageously and conveniently employed. Rigid polyvinyl chloride is preferred, however, as it is easy to mold and also has good tensile, impact and dielectric strength. The preferred embodiment also contemplates that main body portion 10 and first and second portion 16, 18 will be integrally formed with one another from a single length of the rigid plastic material.

Moreover, and with reference to the preferred embodiment, at least main body portion 10 and first end portion 16 which defines the S-shaped appliance mounting loop have roughened surfaces. This feature prevents or substantially reduces axial movement of the drop wire along the dead end appliance following installation. While any number of means may be satisfactorily used to provide these roughened surfaces, in the preferred embodiment here under discussion which is constructed from rigid polyvinyl chloride, main body portion 10 and first end portion 16 are coated with a friction generating material such as aluminum oxide grit. One such alternative means would be to simply mix a suitable friction generating material directly with the raw plastic materials which are manufactured into a rod like member for forming appliance or accessory A.

Locating indicia 62 which may conveniently comprise a mark or line painted on main body portion 10 adjacent first end area 12 is utilized to assist in aligning the drop wire and dead end appliance for assembly purposes as will hereinafter be described in detail.

Figure 3:
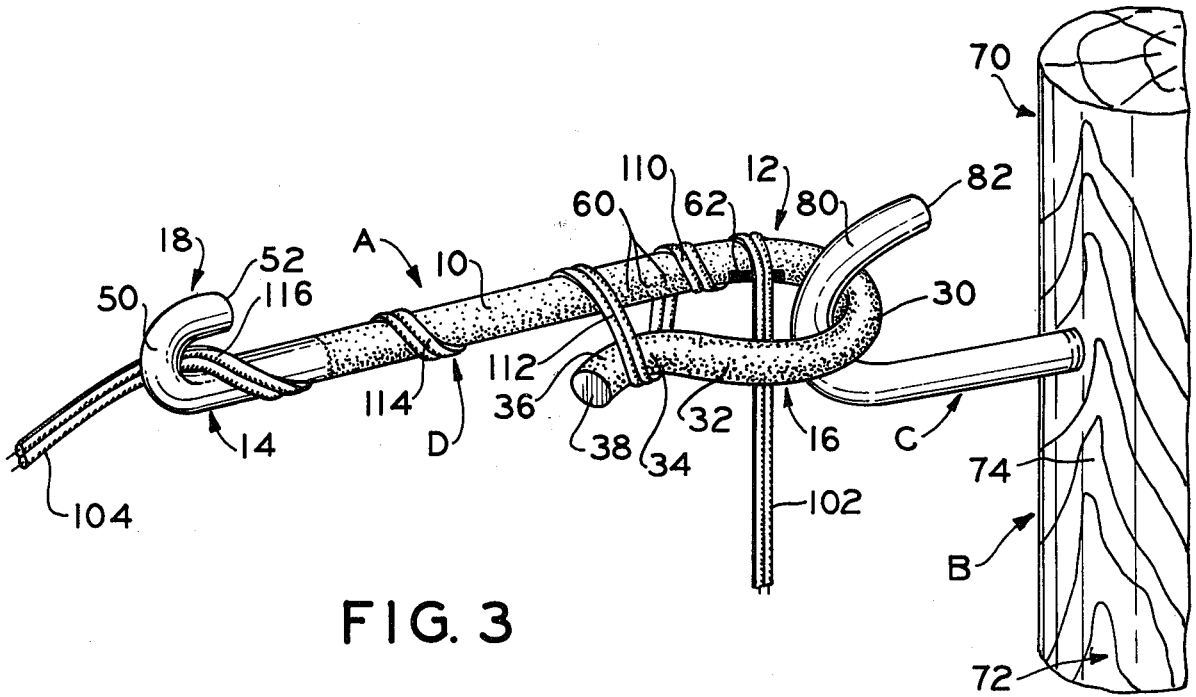
FIG. 3 shows a contemplated preferred installation of the subject appliance for supporting an electrical conductor type drop wire.

With particular reference to FIG. 3, description will now be made with reference to utilization of the subject dead end appliance or accessory construction in a specific application. In the preferred arrangement here under discussion, drop wire dead end appliance A is to be mounted to service pole B. Typically, this mounting is spaced toward upper area 70 of the pole to provide sufficient drop wire span clearance from ground level so as to not interfere with vehicles or the like passing thereunder. From the dead end appliance or accessory, drop wire D extends generally downward toward the lower area 72 of the pole for actual customer service installation (not shown).

Typically, hanger C comprises a rigid book-like member having a portion thereof (not shown) embedded into service pole B from outer surface 74 thereof. Such a hanger may be constructed from any convenient rigid material and may include, for example, an elongated portion facilitating threaded mounting of the hanger to the service pole. Moreover, the hook-like member includes a curvilinear hook portion or area 80 terminating in a terminal end 82. When installed on the service pole, hanger C is located such that a plane defined by curvilinear area 80 is generally vertically disposed with terminal end 82 being located toward upper pole area 70. This installation allows the dead end appliance to be disposed in the preferred position relative to the service pole. Other hanger type arrangements and styles could also be advantageously employed without in any way departing from the scope or intent of the subject new dead end appliance.

Appliance A is hooked over hanger structure C so that first curvilinear section 30 of the S-shaped loop engages curvilinear area 80 of hanger C. The portion of the linear body or drop wire conductor D designated at 102 forms what is commonly known as the drop end and is fed through the S-shaped loop area defined by first end portion 16. From there, the remainder of the drop wire conductor in contact with dead end appliance A is wrapped once around main body portion 10 and once around both the S-shaped loop at second curvilinear portion 34 thereof and main body portion 10. From there, the drop wire conductor is wrapped at least once, preferably one and one half times, around main body portion over the remaining length thereof with the final turn of the dead end conductor passing to one side of the generally U-shaped loop defined by second end portion 18. Conductor D then extends from the generally U-shaped loop at numeral 104 to the service line interconnection with the distributor line (not shown) to form what is commonly referred to as the span.

The function of the S-shaped loop at first end portion 16 is to enable dead end appliance A and drop wire cable D to be attached to service pole B at a desired area thereof and also retain drop end 102 of conductor D portion. Moreover, when span 104 is placed under tension for one reason or another, first generally straight section 32 and second curvilinear section 34 of the S-shaped mounting loop start a snubbing or restraining action which tends to close the gap between second curvilinear area 34 and main body portion 10. At the same time, this area of the appliance also takes up some of the axial load created by placing span 104 under tension.

The generally U-shaped loop defined by second end portion 18 prevents span 104 from unwrapping from the body portion 10 and also supports the end of the span as it departs from the dead end appliance.

The roughened surface areas of the elongated, generally straight main body portion 10 and first end portion 16, as generally designated 60 in the FIGURES and described hereinabove, act to substantially reduce axial movement of conductor D along the dead end appliance following conductor installation. The surface of the generally U-shaped loop is preferably and normally maintained in a smooth condition because there will be some movement of span 104 thereagainst due to the wind and other elements acting thereagainst over the length thereof. Therefore, if the surface of the loop were also roughened, an abrading effect between the appliance and the conductor in the vicinity of the loop could well be present and could cause conductor damage.

It should be appreciated that the subject appliance may also be conveniently affixed to surfaces other than service pole B as described hereinabove. For example, the appliance could be affixed to building walls and the like for performing the same dead ending function. However, the specific nature and mounting of hanger C to such alternative surface areas may have to be varied somewhat.

The actual manner of application for the above described drop wire dead end appliance A to dead end appliance D to service pole B comprises the following steps:

(1) hang appliance A on hanger C on service pole B by means of the S-shaped loop defined by first end portion 16;

(2) form a loop in drop wire conductor D with span side 104 held in the right hand and drop end 102 held in the left hand;

(3) place the loop thus formed over hanger C;

(4) retain drop end 102 of the conductor in the left hand while span 104 in the right hand is pulled until taut around hanger C;

(5) grasp dead end appliance A in the right hand and pull it snug against the inside of hanger C;

(6) allow the dead end appliance to lie parallel to drop end 102 of the conductor which is retained in the left hand;

(7) alter the left hand grip on drop wire conductor D so that the left hand thumb is spaced along main body portion 10 from the generally U-shaped loop defined by second end portion 18 by approximately ½ inches, the end of the thumb thus forming the starting point for application of drop wire conductor D onto the dead end appliance itself;

(8) remove the dead appliance and the drop wire conductor from hanger C while maintaining the starting point on drop end 102 with the left hand thumb;

(9) place the dead end appliance over or on top of drop wire conductor D with second straight section 36 and terminal end 38 facing downwardly and then slide the drop wire conductor into the reversing loop or hook defined by first end portion 16, letting the end of the left thumb contact locating indicia or starting mark 62 on elongated, generally straight main body portion 10;

(10) while maintaining the application starting point of drop end 102 on the dead end appliance, transfer the grasp of the appliance from the right hand to the left hand so that it will be gripped in the left hand along with the drop wire conductor D;

(11) grasp span side 104 of the conductor in the right hand and bring it up and around main body portion 10 of dead end appliance A making a complete turn or wrap 110 and then sliding the completed turn or wrap into the reversing loop area so that it is snug around main body portion 10;

(12) with the right hand still grasping span side 104 of the conductor, make a complete turn or wrap 112 around main body portion 10 and second end portion 16 at the area of merger between first generally straight section 32 and second curvilinear section 34;

(13) make further one and a half uniformly spaced wraps 114, 116 around main body portion 10 with these wraps being spaced along the body portion such that drop wire conductor D will slide in and lie over the generally U-shaped loop defined by second end portion 18;

(14) grasp the dead end appliance having the conductor wrapped therearound or hereinabove described in the right hand and with drop end 102 of the conductor in the left hand, pull the assembled appliance toward and over terminal end 82 of hanger C curvilinear portion 80 in order to complete the appliance installation.

It should be appreciated that reference made hereinabove to the right and left hand will be reversed in the event that assembly is made from the opposite side of span 104. Moreover, and although it is preferred to include wrap or turn 110 when installing the drop wire on the appliance, the subject dead end appliance will work equally well if this particular wrap is omitted and drop wire conductor D is wrapped the one complete turn 112 around the generally S-shaped reversing loop of hook and the turns 114, 116 around main body portion 10 to the generally U-shaped reversing loop or hook.

While the subject drop wire dead end appliance has been described with reference to a particular overall configuration for first and second end portions 16, 18 defining generally S and U-shaped reversing loops respectively, it will be further appreciated to those skilled in the art that other configurations could also be advantageously employed in practicing the subject inventive concepts without in any way departing from the scope or intent thereof.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. In a drop wire type of conductor installation, the combination of: an elongated conductor extending from a source end to a terminal end disposed at a lower elevation than said source end and a drop wire dead end accessory supporting said conductor relative to a rigid member disposed intermediate said conductor source and terminal ends, said dead end accessory comprising an elongated generally straight body having reversing loops at the opposite ends thereof, one of said loops having a generally S-shaped configuration and received on a mounting member affixed to said rigid member for maintaining said accessory in a desired position thereon intermediate the desired path for said conductor between said source and terminal ends, said S-shaped reversing loop being mountably received by said mounting member with said conductor extending from said source end to said other loop, spirally around said body toward said S-shaped reversing loop, at least once around both said S-shaped reversing loop and said body and thence outwardly of said accessory to said terminal end, said other loop preventing undesired unwrapping of said conductor from said accessory.

2. The combination as defined in claim 1 wherein said loops are rotated generally 90° from each other at the opposite ends of said elongated body.

3. The combination as defined in claim 1 wherein said accessory is constructed from a rod-like member with said reversing loops formed integral therewith.

4. The combination as defined in claim 3 wherein said rod-like member is constructed from a generally rigid plastic material and has a generally circular cross-section.

5. The combination as defined in claim 1 wherein at least said body and generally S-shaped reversing loop have distinctly roughened surfaces.

6. The combination as defined in claim 5 wherein said distinctly roughened surfaces are defined by particulate matter affixed to said body and S-shaped reversing loop.

7. The combination as defined in claim 1 wherein said conductor is further wrapped around said body at the end thereof communicating with said S-shaped reversing loop subsequent to the at least one wrap around both said S-shaped reversing loop and body and thence to said terminal end.

8. An appliance for supporting a portion of the length of a linear body relative to a rigid member intermediate linear body source and lead ends, said appliance comprising:

an elongated body having a generally circular cross-section including a straight main portion, a first appliance mounting portion at one end area of said main body portion and a second linear body receiving portion at the other end area of said main body portion, said main body, first appliance mounting and second linear body receiving portions being integrally formed with each other; said first portion having a generally S-shaped configuration including a first curvilinear reversely bent area at said body portion one end area formed so that a section thereof extends back over a section of said main body portion toward said other end area in a converging relationship with said main body portion and with said first portion including a section adjacent said first reversely bent area extending outwardly of said main body portion, said first and main body portions defining a first portion plane; said second portion including a second curvilinear reversely bent area at said body portion other end area so that a section thereof extends back over a section of said main body portion toward said one end area, said second and main body portions defining a second portion plane disposed generally normal to said first portion plane; and, said main body and first portions having distinctly roughened surface areas for at least substantially reducing relative movement between said linear body and appliance when said portion of the length of said linear body is operably disposed on said appliance, said appliance adapted to be received at said first appliance mounting portion by a mounting means fixedly secured to said rigid member for maintaining said appliance in position intermediate a desired path for said linear body between said source and terminal ends, whereby said appliance is adapted to receive said portion of the length of said linear body in a manner such that said linear body extends from said source end to said appliance second linear body receiving portion, is spirally wrapped around said main body portion toward said first appliance mounting portion and is wrapped at least once around said main and first body portions prior to extending from said appliance to said linear body terminal end.

9. The appliance as defined in claim 8 wherein said appliance body is constructed from rigid polyvinylchloride plastic and said distinctly roughened surfaces are defined by particulate matter affixed to said main body and first appliance mounting portions.

* * * * *